United States Patent
Higham et al.

(10) Patent No.: US 6,445,981 B1
(45) Date of Patent: Sep. 3, 2002

(54) CONTROLLER AND CONTROL METHOD FOR SATELLITE ORBIT-KEEPING MANEUVERS

(75) Inventors: John S. Higham, Mountain View; Keith Reckdahl, Palo Alto, both of CA (US)

(73) Assignee: Space Systems/Loral, Inc., Palo Alto, CA (US)

( * ) Notice: Subject to any disclaimer, the term of this patent is extended or adjusted under 35 U.S.C. 154(b) by 0 days.

(21) Appl. No.: 09/517,032

(22) Filed: Mar. 2, 2000

(51) Int. Cl.⁷ .............. B64G 1/24; B64G 1/10

(52) U.S. Cl. .............. 701/13; 244/158 R; 244/164; 244/172

(58) Field of Search .............. 701/13; 244/158 R, 244/164, 172, 165, 169

(56) References Cited

U.S. PATENT DOCUMENTS

| | | | | |
|---|---|---|---|---|
| 3,866,025 A | * | 2/1975 | Cavanagh | 701/13 |
| 4,537,375 A | * | 8/1985 | Chan | 244/171 |
| 5,349,532 A | * | 9/1994 | Tilley et al. | 701/226 |
| 5,400,252 A | * | 3/1995 | Kazimi et al. | 701/13 |
| 5,765,780 A | * | 6/1998 | Barskey et al. | 244/165 |
| 5,931,421 A | * | 8/1999 | Surauer et al. | 244/165 |
| 6,032,904 A | * | 3/2000 | Hosick et al. | 244/169 |
| 6,219,593 B1 | * | 4/2001 | Kroncke | 701/13 |

* cited by examiner

*Primary Examiner*—William A. Cuchlinski, Jr.
*Assistant Examiner*—Olga Hernandez
(74) *Attorney, Agent, or Firm*—Kenneth W. Float

(57) ABSTRACT

A controller and control method that perform satellite orbit-keeping maneuvers and proportionally scale orbit-keeping pulses to automatically minimize disturbance torques on-board a satellite. The controller and control method may also be used to remove residual momentum stored in spinning momentum wheels.

12 Claims, 2 Drawing Sheets

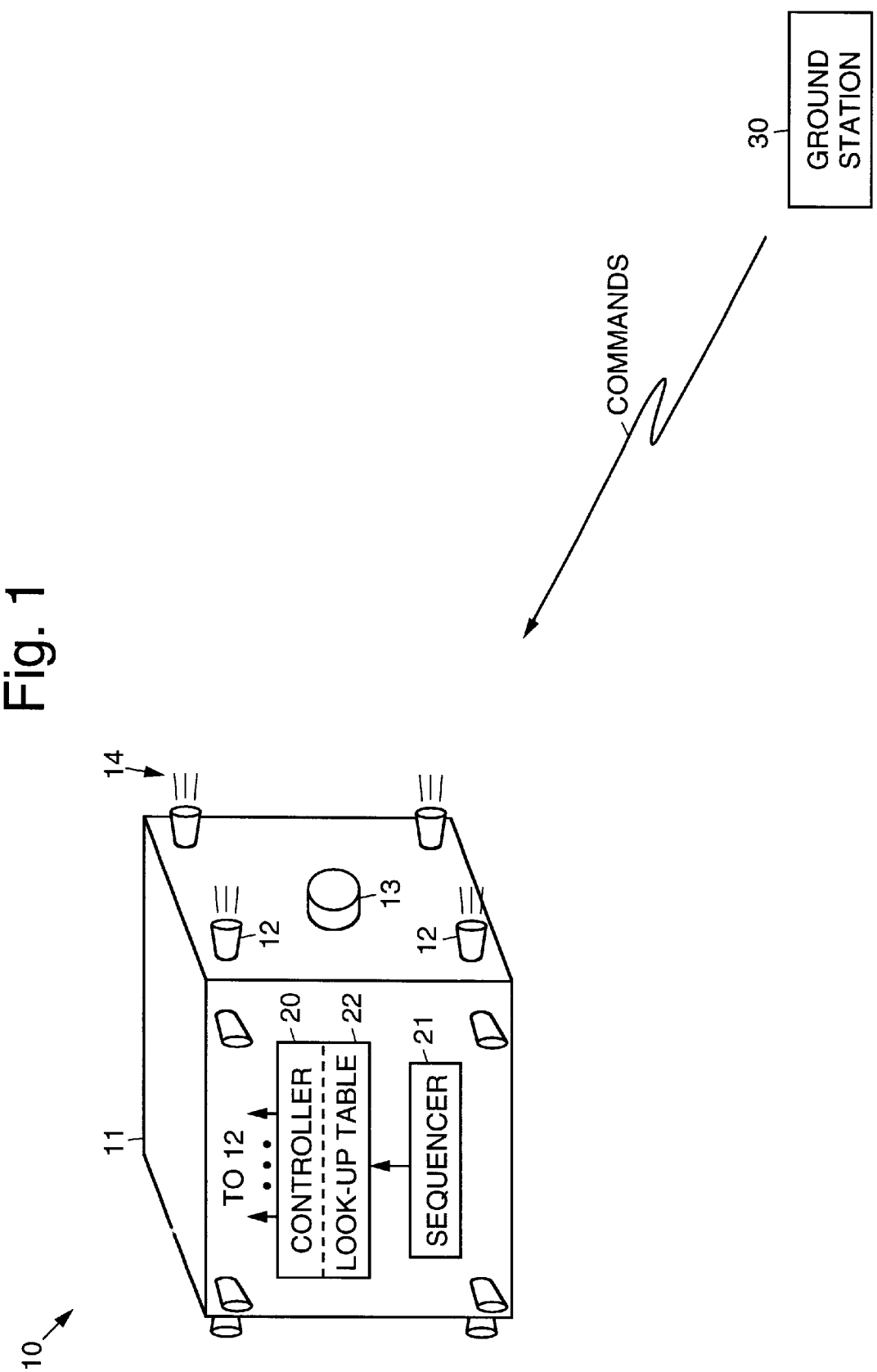

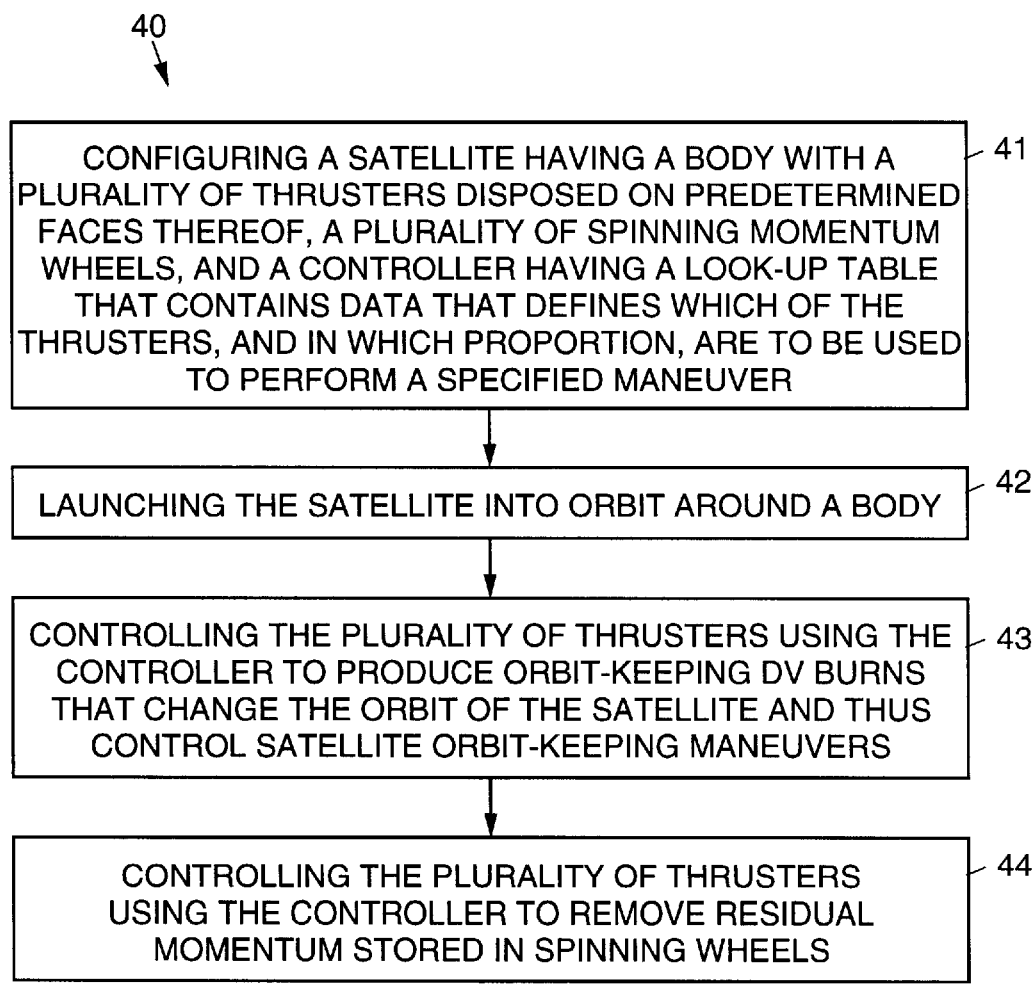

CONTROLLER AND CONTROL METHOD FOR SATELLITE ORBIT-KEEPING MANEUVERS

BACKGROUND

The present invention relates to satellites, and more particularly to a controller and control method for use in performing satellite orbit-keeping maneuvers.

Orbit-keeping is required of virtually all useful satellite applications. Orbit-keeping is typically performed by initiating a series of thruster pulses. Although ground-based operators have conventionally uplinked a command that controls a thruster pulse duration specified by orbit-keeping requirements, the pulse duration has not been automatically proportioned on the satellite to minimize the disturbance torque and also to dump any residual momentum, typically stored in spinning wheels.

Regarding generally related prior art patents, U.S. Pat. No. 5,400,252 teaches east-west orbit control during north-south maneuvers such that attitude disturbance is minimized. U.S. Pat. No. 5,349,532 teaches momentum control via ginballing and throttling during north-south maneuvers. U.S. Pat. No. 4,537,375 issued to Chan teaches ground-based thruster pulse selection (using a human operator) to minimize disturbances.

Accordingly, it would be advantageous to have an improved controller and control method for use in performing satellite orbit-keeping maneuvers. It would be advantageous to have an improved controller-and control method that automatically proportions the pulse duration on the satellite to minimize the disturbance torque and also dump residual momentum, such as is stored in spinning wheels.

SUMMARY OF THE INVENTION

The present invention provides for a controller and control method that perform satellite orbit-keeping maneuvers and that allow orbit-keeping pulses to be scaled proportionally to minimize disturbance torques automatically on-board a satellite. The controller and control method may also be used to change the momentum stored in spinning wheels, which includes both the addition or removal of momentum.

Orbit-keeping pulses vary from day to day and season to season. Prior to the present invention, each participating thruster was manually scaled proportionally to its unique disturbance using a ground-based human operator. The present invention automatically performs the proportional scaling on-board the satellite.

Exemplary apparatus in accordance with the present invention is used on a satellite having a body, a plurality of thrusters disposed on predetermined faces thereof that are used to maneuver the satellite, and a plurality of spinning momentum wheels that are used to control momentum. The apparatus comprises a controller containing a look-up table that contains data that defines which of the thrusters, and in which proportion, are to be used to perform a specified maneuver. The controller controls the plurality of thrusters to produce orbit-keeping $\Delta v$ burns that change the orbit of the satellite and thus control satellite orbit-keeping maneuvers. The look-up table contains the time of each maneuver, the duration of each maneuver, and the direction of each maneuver.

The controller controls the thrusters to produce orbit-keeping pulses that are scaled proportionally to minimize disturbance torques on-board the satellite. The controller may also be used to control the thrusters to produce orbit-keeping $\Delta v$ burns that remove residual momentum stored in spinning momentum wheels. The controller preferably controls the thruster on-times for the orbit-keeping pulses to create a small amount of torque to dump momentum, while keeping the overall combined thruster on-times constant. The controller processes a commandable parameter uplinked from a ground station that sets a lower limit of the quantity of momentum that is to be dumped.

An exemplary control method comprises the following steps. A satellite having a body configured with a plurality of thrusters disposed on predetermined faces thereof, a plurality of spinning momentum wheels, and a controller having a look-up table that contains data that defines which of the thrusters, and in which proportion, are to be used to perform a specified maneuver. The satellite is launched into orbit around a body, such as the earth. The plurality of thrusters are controlled using the controller to, produce orbit-keeping , $\Delta v$ bums that change the orbit of the satellite and thus control satellite orbit-keeping maneuvers. The plurality of thrusters may also be controlled using the controller to remove residual momentum stored in the spinning momentum wheels. The controller controls the thruster on-times for the orbit-keeping pulses to create a small amount of torque to dump momentum, while keeping the overall combined thruster on-times constant. The controller processes 5 a commandable parameter that is uplinked from a ground station that sets a lower limit of the quantity of momentum that is to be dumped.

Using the present invention, an operator commands a pulse duration as specified by orbit-keeping requirements for the satellite. The pulse duration is automatically proportioned on the satellite to minimize the disturbance torque and also to dump any residual momentum. typically stored in the spinning wheels.

BRIEF DESCRIPTION OF THE DRAWINGS

The various features and advantages of the present invention may be more readily understood with reference to the following detailed description taken in conjunction with the accompanying drawings, described by way of example, and wherein like reference numerals designate like structural elements, and in which:

FIG. 1 illustrates an exemplary controller in accordance with the principles of the present invention employed in an orbiting satellite; and FIG. 2 is a flow diagram that illustrates an exemplary control method in accordance with the principles of the present invention.

DETAILED DESCRIPTION

Referring to the drawing figures, FIG. 1 illustrates an exemplary controller 20 in accordance with the principles of the present invention. The controller 20 is disposed on a satellite 10 having a body 11, a plurality of thrusters 12 disposed on various faces thereof, and a plurality of spinning momentum wheels 13 that are used to control momentum. The controller 20 is used to control the plurality of thrusters 12 to produce orbit-keeping $\Delta v$ burns 14 or pulses 14 that change the orbit of the satellite 10 and thus control satellite orbit-keeping maneuvers. The controller 20 on the satellite 10 does the work of what was previously performed manually by ground operators located at a ground station 30.

In accordance with prior art procedures, when an orbit-keeping maneuver is required, a satellite operator calculates the time of the maneuver, the duration of the maneuver, and the direction of the maneuver. The satellite operator then determines which thrusters 12 will yield the proper direction, and which proportion each of the thrusters 12 need to fire to yield the proper total duration. When assigning the proportion of the total duration to a group of thrusters 12. the ground operator typically considers the amount of torque each thruster 12 produces and attempt to proportion each thruster 12 so the net torque developed when the group is fired together sums to zero. This is so that the end result is as close to a pure force imparted on the satellite 10, because any resulting torque causes both an attitude transient and an accumulation of momentum that requires storage.

The present controller 20 relieves the tedious burden required by the ground operator. Thus, when the ground operator determines that an orbit-keeping maneuver is required. and if it is a west maneuver, 250 msec in duration to be performed at 13:52:14 GMT, for example, all the ground operator has to do is upload these three variables and the controller 20 on the satellite 10 does the rest. The controller 20 is also designed to work in conjunction with a sequencer 21. such as one disclosed in copending U.S. patent application Ser. No. 09/531.704, filed Mar. 20, 2000. entitled Sequencer and Method for Automating a Series of Satellite Orbit-Keeping Maneuvers assigned to the assignee of the present invention, but the sequencer 21 is not a requirement. The contents of U.S. patent application Ser. No.09/531,704 is incorporated herein by reference in its entirety.

A preferred embodiment of the controller 20 for a satellite 10, for example, developed by the assignee of the present invention, is as follows. An orbit-keeping maneuver is requested at the specified time it is scheduled to occur. The maneuver is either north, south, east or west in type. North/south maneuvers are handled differently than east/west maneuvers. Assume a case of an east/west maneuver. On the satellite 10, there are eight thrusters 12 that are capable of producing either an east or west Δv burn 14 or pulse 14. The preferred embodiment of the controller 20 employs a look-up table 22 that defines which of the eight thrusters 12, and in which proportion, are to be used to perform the east or west maneuver.

To further this example, on the satellite 10, four of the eight aforementioned thrusters 12 produce a west Δv burn 14 while the remaining four thrusters 12 produce an east Δv burn 14. For the sake of this example, the thrusters 12 may be numbered 1 through 8,with thrusters 1 through 4 producing a west Δv burn 14 and thrusters 5 through 8 producing a east Δv burn 14. To obtain the correct torque free proportions when the thrusters 12 are fired, the look-up table 22 may look like the following for a west Δv burn 14:

| Thruster No. | 1 | 2 | 3 | 4 | 5 | 6 | 7 | 8 |
|---|---|---|---|---|---|---|---|---|
| West Δv burn | 1 | 0.9 | 0.7 | 0.8 | 0 | 0 | 0 | 0 |

This table is interpreted such that thruster 1 is relative to the other thrusters 12, in that thruster 1 is on 100% of the time, thruster 2 is on 90% of the time, and so forth. The look-up table 22 allows "east" thrusters to. be used to provide a "west" Δv burn 14 for cases when a failure requires a torque that only an opposing face thruster 12 could deliver.

Continuing on with this example, if the west Δv burn requirement is a total of 250 msec, then the on-time of thruster 1 is 250*1/(1+0.9+0.7+0.8)=74 msec, and thruster 2 has an on time of 250*0.9/3.4=66 msec, thruster 3 has an on-time of 51 msec, and thruster 4 has at on time of 59 msec. The sum total of the four thrusters 12 provides the required 250 msec of on time.

The weighting of the look-up table 22 is determined once at the beginning of life, and is recalibrated roughly annually over the life of the satellite 10 to account for changes in the mass center location, which changes the thruster torques.

The above discussion assumes that the controller 20 delivers a torque-free pulse. However, sometimes that is not what is desired. Any satellite 10 that stores momentum in a wheel 13 by spinning the wheel 13 faster or slower eventually needs to "dump" that momentum. Firing thrusters 12 is an effective way at dumping is momentum, although it is not the only way. Therefore. a thruster pulse fired for orbit-keeping, may also be used to dump momentum, if desired, under certain conditions.

One important point about momentum control, is that until it is the actual time to fire a thruster pulse, it is virtually impossible to predict with sufficient accuracy how much momentum must be dumped. This is important because until the present invention, on-board controllers have not controlled momentum dumping, if it is desired, when performing an orbit-keeping maneuver. This is an important aspect of the present invention.

To manage momentum during an east/west orbit-keeping maneuver, a preferred embodiment of the controller 20 for a satellite 10, for example, assumes that "auto-unloads" provide some degree of momentum management momentum stored in the wheels 13 are below a certain set value, but in a general sense is non-zero such that it is desirable to unload momentum for "free" with the orbit-keeping pulse, but that the stored momentum is not so high as to warrant an auto-unload.

The idea is to slightly change the thruster on-times for the orbit-keeping pulses to create a small amount of torque to dump momentum, while keeping the overall combined thruster on-times constant. Continuing with the above example, a net zero-torque pulse would have the following on-times:

| Thruster No. | 1 | 2 | 3 | 4 | 5 | 6 | 7 | 8 |
|---|---|---|---|---|---|---|---|---|
| West Δv burn | 74 msec | 66 msec | 51 msec | 59 msec | 0 | 0 | 0 | 0 |

One way to develop a torque and maintain the overall 250 msec duration would be to increase the burn duration of thruster 3 to 56 msec and cause thruster 6 to fire for 5 msec, for example. This is because thruster 3 and thruster 6 are on opposite faces of the satellite 10, and firing them as a pair develops the desired torque while the net force imparted is zero. However, this case does not provide "free" momentum management that is desired, because the net result may be 250 msec in the west direction, but it takes 260 msec of overall thruster on-time to deliver the force with the desired torque. While this type of control is not specifically ruled out it is not the preferred embodiment.

Another challenge of calculating the change to the "torque-free" thruster on-time for momentum management purposes is that while a closed-form solution exists, in its simplest form, it may yield nonsensical results such as negative thruster on-times. The preferred embodiment is to use a simple look-up table which is detailed below.

The last bit of information that is missing from the present discussion is a commandable parameter that sets the lower limit of the quantity of momentum that is to be dumped. This is so that if, for example, a thruster LSB is such that the smallest amount of momentum that car be dumped is 0.1 Nms, and the momentum stored in the wheels 13 is 0.01 Nms, the resulting momentum removal would be 0.01−0.1=−0.9 Nms. This means that more momentum was actually put in to the wheels 13 than was removed.

Continuing the example it has been noted that thruster 1 through 4 create a west Δv and thrusters 5 through 8 create an east Δv. With thrusters optimized for this type of maneuver, they are also optimized to create control torques about two of the three rotational axes. Therefore, when developing a look-up table 22, it is feasible to only include the two axes that control torques are available. The look-up table of the controller 20 for the satellite 10, depending on the direction of the orbit-keeping pulse, the polarity of the pitch and yaw momentum that is desired to be dumped, would be as shown in Tables 1 and 2.

For a west Δv burn 14, to dump momentum, the controller actions identified in Table 1 are performed. "T" represents a selected thruster 12, and "h" represents momentum on the axis that is to be made zero. For an east Δv burn 14, to dump momentum the controller actions identified in Table 2 are performed. Again, "T" represents a selected thruster 12, and "h" represents momentum on the axis that is to be made zero.

The look-up table 22 is defined by h which is greater than the commandable minimum momentum LSB, and is the momentum on the axis that is to be made zero. The look-up table 22 for west and east Δv dumping is specific to the LS-1300 satellite developed by the assignee of the present invention, and would be different for other satellites 10.

For the case of north/south orbit-keeping maneuvers, the controller 20 may also be used, but is best suited for implementation with chemical thrusters 12. The preferred embodiment of the controller 20 for the satellite 10 controls electric thrusters 12 for north/south orbit-keeping. The momentum management for orbit-keeping with electric thrusters 12 would not necessarily be via a look-up table 22, but via a controller 20 designed to create torques by gimballing the thrusters 12 in proportion to the momentum that is to be dumped, such as in a manner disclosed in U.S. Pat. No. 5,349,532, for example.

For the purposes of completeness, FIG. 2 is a flow diagram that illustrates an exemplary control method 40 in accordance with the principles of the present invention. The exemplary control method 40 performs satellite orbit-keeping maneuvers and comprises the following steps.

A satellite 10 having a body 11 is configured 41 with a plurality of thrusters 12 disposed on predetermined faces thereof that are used to maneuver the satellite 10, a plurality of spinning momentum wheels 13 that are used to control momentum, and a controller 20 having a look-up table 22 that contains data that defines which of the thrusters 12, and in which proportion, are to be used to perform a specified maneuver. The satellite 10 is launched 42 into orbit around a body, such as the earth. The plurality of thrusters 12 are controlled 43 using the controller 20 to produce orbit-keeping Δv burns 14 that change the orbit of the satellite 10 and thus control satellite orbit-keeping maneuvers. The plurality of thrusters 12 may also be controlled 44 using the controller 20 to remove residual momentum stored in the spinning momentum wheels 13. The controller 20 controls the thruster on-times for the orbit-keeping pulses to create a small amount of torque to dump momentum. while keeping the overall combined thruster on-times constant. The controller 20 processes 45 a commandable parameter that is uplinked from a ground station 30 that sets a lower limit of the quantity of momentum that is to be dumped.

While the spacecraft 10 in the preferred embodiment employs spinning wheels for attitude control, the present invention may be used with any attitude control method, including magnetic torquers, gravity gradient, any of the many types of thrusters.

Thus, an improved controller and control method for use in any performing satellite orbit-keeping maneuvers have been disclosed. It is to be understood that the described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A control method for performing satellite orbit-keeping maneuvers comprising the steps of:

configuring a satellite having a body with a plurality of thrusters disposed on predetermined faces thereof that are used to maneuver the satellite, and a controller comprising a look-up table that contains data that defines which of the thrusters, and in which proportion, are to be used to perform a specified maneuver;

launching the satellite into orbit around a body;

controlling the plurality of thrusters using the controller to produce orbit-keeping Δv burns that change the orbit of the satellite, and produce orbit-keeping pulses that are scaled proportionally to minimize disturbance torques on-board the satellite, and thus control satellite orbit-keeping maneuvers.

2. Apparatus for use on a satellite having a body, a plurality of thrusters disposed on predetermined faces thereof that are used to maneuver the satellite, comprising:

a controller comprising a look-up table that contains data that defines which of the thrusters, and in which proportion, are to be used to perform a specified maneuver, which controller controls the plurality of thrusters to produce orbit-keeping Δv burns that change the orbit of the satellite, and controls the thrusters to produce orbit-keeping pulses that are scaled proportionally to minimize disturbance torques on-board the satellite, and thus control satellite orbit-keeping maneuvers.

3. The apparatus recited in claim 1 wherein the satellite further comprises a plurality of spinning momentum wheels that are used to control momentum.

4. The apparatus recited in claim 2 wherein the controller controls the thrusters to produce orbit-keeping Δv burns that remove residual momentum stored in spinning momentum wheels.

5. The apparatus recited in claim 2 wherein the look-up table contains the time of each maneuver, the duration of each maneuver, and the direction of each maneuver.

6. The apparatus recited in claim 2 wherein the controller controls the thruster on-times for the orbit-keeping pulses to create a small amount of torque to dump momentum, while keeping the overall combined thruster on-times constant.

7. The apparatus recited in claim 1 wherein the controller processes a commandable parameter that sets a lower limit of the quantity of momentum that is to be dumped.

8. The method recited in claim 7 wherein the satellite further comprises a further comprises a plurality of spinning momentum wheels that are used to control momentum.

9. The method recited in claim 8 further comprising the step of:

controlling the plurality of thrusters using the controller to remove residual momentum stored in spinning wheels.

10. The method recited in claim 8 wherein the look-up table contains the time of each maneuver, the duration of each maneuver, and the direction of each maneuver.

11. The method recited in claim 8 wherein the controller controls the thruster on-times for the orbit-keeping pulses to create a small amount of torque to dump momentum, while keeping the overall combined thruster on-times constant.

12. The method recited in claim 8 wherein the controller processes a commandable parameter that sets a lower limit of the quantity of momentum that is to be dumped.

\* \* \* \* \*